United States Patent
Burton et al.

(10) Patent No.: US 6,515,820 B1
(45) Date of Patent: Feb. 4, 2003

(54) SINE SEEK ADAPTATION AT VOLTAGE AND TEMPERATURE MARGINS

(75) Inventors: Matthew Chad Burton, Edmond, OK (US); David C. Waugh, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/389,899

(22) Filed: Sep. 3, 1999

Related U.S. Application Data
(60) Provisional application No. 60/101,784, filed on Sep. 25, 1998.

(51) Int. Cl.[7] ............................................. G11B 5/596
(52) U.S. Cl. ........................................................ 360/78.06
(58) Field of Search ............................. 360/78.04, 78.06

(56) References Cited

U.S. PATENT DOCUMENTS

| | | | |
|---|---|---|---|
| 5,050,146 A | * | 9/1991 | Richgels et al. ..... 360/78.04 X |
| 5,128,813 A | * | 7/1992 | Lee .......................... 360/78.07 |
| 5,465,034 A | * | 11/1995 | Andrews, Jr. et al. ... 360/78.04 X |
| 5,680,272 A | | 10/1997 | Kadlec et al. |
| 5,872,674 A | | 2/1999 | Eddy |
| 5,917,672 A | | 6/1999 | Pham et al. |
| 6,115,205 A | * | 9/2000 | Waugh et al. ........... 360/78.06 |

* cited by examiner

Primary Examiner—David Hudspeth
Assistant Examiner—K. Wong
(74) Attorney, Agent, or Firm—Merchant & Gould P.C.

(57) ABSTRACT

Disclosed is a method of compensating for non-optimal operating conditions during a sine seek operation. A disc drive with a seek controller provides a feedforward signal to an actuator during a portion of the operation of an actuator and provides a velocity signal during another portion of operation of the actuator. The controller also stores a velocity error switch point. If it is determined that the feed forward signal is lower or higher than a first nominal value, then the feed forward signal provided by the controller is adjusted. Furthermore, if it was determined that the feed forward signal is lower than the first nominal value, the velocity error switch point is decreased.

13 Claims, 5 Drawing Sheets

SINE SEEK ADAPTATION AT VOLTAGE AND TEMPERATURE MARGINS

RELATED APPLICATION

This application claims the benefit of provisional application Ser. No. 60/101,784 entitled "Sine Seek Adaptation at Voltage and Temperature Margins" filed on Sep. 25, 1998.

FIELD OF THE INVENTION

The invention relates generally to disc drives and specifically to disc drive seek controllers. More particularly, the invention relates to sine seek controllers operating within temperature or voltage margins.

BACKGROUND OF THE INVENTION

Disc drives are used in workstations, laptops and personal computers to store large amounts of information in a readily accessible form. Typically, a disc drive includes a magnetic disc which is rotated at a constant high speed by a spindle motor. The disc surfaces are divided into a series of concentric data tracks that can store information as magnetic transitions on the disc surface.

A disc drive also includes a set of magnetic transducers that are used to either sense existing magnetic transitions during a read operation or to create new magnetic transitions during a write operation. Each magnetic transducer is mounted in a head. Each head is mounted to a rotary actuator arm via a flexible element which can accommodate movement of the head during operation. The actuator arm serves to selectively position the head over a particular data track to either read data from the disc or to write data to the disc.

The actuator arm is driven by a voice coil motor. The magnetic transducers, mounted in the heads, are present at the ends of the arms which extend radially outward from a substantially cylindrical actuator body. This actuator body is moveably supported by a ball bearing assembly known as a pivot bearing or pivot bearing assembly. The actuator body is parallel with the axis of rotation of the discs. The magnetic transducers, therefore, move in a plane parallel to the discs surface.

The voice coil motor typically includes a coil which is mounted in the actuator arm at the end opposite the heads. This coil is permanently immersed in a magnetic field resulting from an array of permanent magnets which are mounted to the disc drive housing. Application of current to the coil creates an electromagnetic field which interacts with the permanent magnetic field, causing the coil to move relative to the permanent magnets. The voice coil motor essentially converts electric current into mechanical torque. As the coil moves, the actuator arm also moves, causing the heads to move radially across the disc surface.

Control of this movement is accomplished via a servo system. In this control system, position (or servo) information is prerecorded on at least one surface of one of the discs. The servo system may be dedicated, which means that an entire disc surface is prerecorded with servo information. In this case, a particular head is dedicated to reading only servo information. Alternatively, the servo system can be embedded meaning that the servo information is interweaved with the user data, and is intermittently read by the same heads which are used to read and write information.

Servo systems typically include two controllers, a seek controller and a tracking controller. The seek controller manages large head movements for approximate placement of the actuator arm. Then, the tracking controller is responsible for the small displacements necessary to follow a particular track.

High performance disc drive customers require a drive's operation to be verified over a wide range of conditions, such as hot and cold temperatures and high and low voltages. In addition, the environments in which drives are implemented may often demonstrate similar conditions. These conditions greatly affect physical characteristics of drive components, thus changing drive operation. High temperatures and low voltages, for instance, tend to degrade performance and can lead to permanent drive damage, directly or indirectly. Therefore, it is necessary to design disc drives such that they can be operated in a wide range of temperature margins.

One of the main problems with drive operation over a wide range of temperatures is servo coil resistance variation. The higher the temperature, the higher the resistance, and vice versa. Since the servo controller is designed to seek from one position to another in a minimum amount of time, the controller often tends to put the coil current in saturation, i.e., the controller demand is larger than the available current due to limits on the voltage supply and coil back electromotive force, during the acceleration phase to accelerate as fast as possible. The higher the coil resistance, the lower the coil current saturation point, thus limiting the amount of acceleration and deceleration that can be achieved. When the coil current is in saturation, the actuator drive can not supply any more current, regardless of the controller's demand. Because of this, the controller is limited in its controlling abilities and it can only decrease the acceleration. The same is true for the deceleration phase of the seek. If the coil current is in saturation, the controller can only decrease the "braking" force. This is a problem if the seek operation is moving too fast for the allowable deceleration to stop the actuator on the desired destination. This leads to significant overshoot and an increase in seek time. In addition, calibrations that are performed during the deceleration phase will produce inaccurate results under this condition.

In addition to the fluctuation in temperature margins, higher or lower nominal voltages similarly appear as lower or higher coil resistance to the servo controller, respectively. Therefore, voltage margins can also cause significant overshoot problems and inaccurate calibrations.

Because of these conditions, it has been necessary to detect sub-optimal conditions during a seek operation and adjust the controller to compensate for them. In the past, current in the acceleration saturation phase was measured and if it was lower than a nominal value, the demanded velocity signal would be scaled down by a scalar value. This scalar value, labeled SDEM (slope-demand), is calculated according to equation (1) below:

$$SDEM = (\text{measured current average})/(I\_NOM1), \quad (1)$$

where I_NOM is a minimal current value that is determined empirically. The higher the coil resistance or the lower supply the voltage, the lower the measured current would be. Thus, the demand velocity would be scaled down, thereby preventing the deceleration phase of the seek operation from entering saturation. Any higher than nominal conditions resulted in no change to the demand velocity signal since there is no risk of entering saturation in the deceleration phase. This was accomplished by clipping the maximum value of this scalar value to one.

However, with the introduction of sine seek controllers, i.e., a seek controller that is open-loop until the peak of the deceleration phase is reached, simply scaling down the velocity demand is not enough. While scaling down the velocity demand does help prevent deceleration saturation at low voltage and/or high temperatures, another problem is introduced. Sine seek controllers operate by looking for a constant amount of velocity error between the demand velocity and the estimated velocity to decide when to switch from acceleration to deceleration. When the velocity error is less than this fixed value, the switch is made. At that switch point, the sine shaped feed forward current transitions the controller from acceleration to deceleration. Once the feed forward sequence has completed, i.e., the peak of the deceleration phase is reached, the controller will close the loop and return to velocity control. FIG. 1 is a graph of an estimated velocity profile for a sine seek controller under nominal conditions.

It can be seen from FIG. 1 that velocity 11 is plotted along the vertical axis and tracks to go 13 is plotted along the horizontal axis. The desired position 15 on a disc, i.e., the point to where the controller is seeking to, is located at the origin. The demand velocity curve 10 is a table of velocity values at various distances from the desired position. The demand velocity curve 10 is stored in a memory (not shown) accessible to the controller.

Thus, as can be seen, at the origin, i.e., desired position, the demand velocity is zero and is at its greatest further away from the origin. The switching curve 12 is derived from the demand velocity curve by an offset equal to a constant velocity error switch point value 17.

When a seeking operation is performed, the sine seek controller injects a feed forward signal having a particular frequency into the actuator which moves the actuator assembly at a certain acceleration until an acceleration saturation point is reached as shown at point 16. At this point the velocity of the actuator still increases but not as fast. Once the velocity crosses the switch curve 12, the feed forward signal transitions the actuator from acceleration to deceleration. When the velocity crosses the demand velocity curve, velocity control for the actuator is implemented and the actuator is controlled by a velocity error signal output by the controller which is the difference between the demand velocity curve and the actual velocity signal fed back to the controller.

To prevent exciting resonances when the loop is closed, the velocity error switch point is set empirically for each seek length range such that the estimated velocity should be slightly more than the demand velocity after the feed forward sequence is completed.

At lower than nominal conditions, however, the actuator cannot accelerate as quickly thus achieving less momentum by the time the switch point is reached. Because of this, the feed forward current signal over compensates and the estimated velocity is less than the demand velocity when the loop is closed. This forces the controller to cause the actuator to accelerate again for a very short period to catch up with the demand before entering the deceleration phase. FIG. 2 is a graph of a demand velocity profile at lower than nominal conditions. The bump in the profile excites resonances which greatly affects the controller's ability to settle on a desired destination.

Thus, a need remains for a method of controlling a sine seek controller under higher and lower than nominal conditions.

SUMMARY OF THE INVENTION

The invention involves a method of operating a sine seek controller under voltage and temperature operating margins.

According to a first aspect of the invention, there is provided a method for adaptively controlling operation of a sine seek controller of a disc drive. The sine seek controller provides a feed forward signal to an actuator during a portion of the operation of the actuator and the sine seek controller provides a velocity control signal to the actuator during another portion of the operation of the actuator. The sine seek controller also stores a velocity error switch point. The method includes steps of supplying a feed forward signal to an actuator operatively coupled to the controller, measuring a signal ouput by the controller is the amplitude of the feed forward signal is decreased by a first scalar value if the measured signal is lower than a first nominal value and the velocity error switch point is increased by a second scalar value if the measured signal is higher than a second nominal value. The second scalar value is different from the first scalar value.

According to a second aspect of the invention, there is provided a disc drive having a controller and an actuator operatively coupled to the controller. The controller supplies a feed forward signal during a portion of a seek operation and a velocity control signal during another portion of a seek operation. The controller also stores a velocity error switch point. The actuator receives the feed forward signal and velocity control signal. The controller is programmed to detect the feed forward signal output by it. The controller decreases an amplitude of the feed forward signal by a first scalar value if the detected feed forward signal is lower than a first nominal value, and increases the velocity error switch point by a second scalar value if the measured signal is higher than a second nominal value.

According to a third aspect of the invention, the method also includes decreasing the velocity error switch point by the first scalar value if the measured signal is lower than the first nominal value.

These and other features as well as advantages which characterize the present invention will be apparent from a reading of the following detailed description and a review of the associated drawings.

DETAILED DISCUSSION

Figure 3:
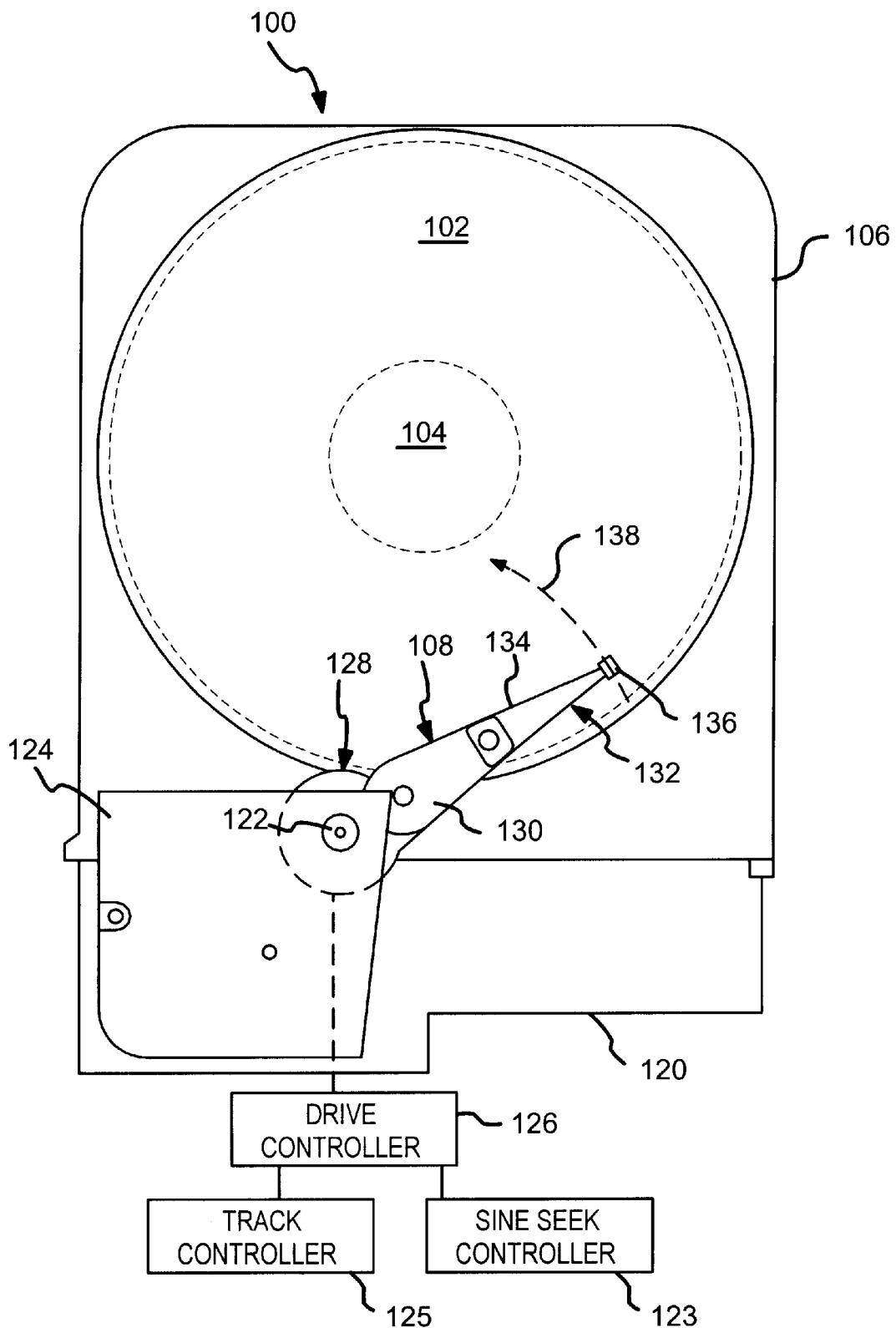
FIG. 3 is a schematic view of a disc drive as contemplated by the invention.

Referring now to the drawings, in which similar reference numbers are used to denote similar structures or items, FIG. 3 is a schematic of a disc drive 100. Disc drive 100 includes a plurality of magnetic discs 102 (only one is illustrated) mounted for rotational movement about an axis defined by spindle 104 within housing 106. Disc drive 100 also includes a stacked actuator system 108 mounted to a base plate 110 of the housing 106. The actuator system 108 is pivotally movable relative to disc 102 about axis 112. A cover 114 preferably covers a portion of the stacked actuator system 108. A drive controller 116 is operatively coupled the stacked actuator 108. In a preferred embodiment, the drive controller 116 is either mountable within the disc drive 100 or is located outside of the disc drive 100 with suitable connection to the stacked actuator 108. The drive controller 116 includes both a seek controller 123 and a tracking controller 125.

In a preferred embodiment, stacked actuator 108 includes an actuator arm assembly 118, a rigid support member 120, and a head gimbal assembly 122. Head gimbal assembly 122 includes a load beam or flexure arm 124 coupled to rigid member 120, and a slider 126 coupled by a gimbal (not shown) to load beam 124. Slider 126 supports a transducer for reading information from disc 102 and encoding information on disc 102.

During operation of the disc drive, the drive controller 116 receives position information indicating a portion of a disc 102 to be accessed. Drive controller 116 receives the position information from an operator, a host computer or some other suitable controller. Based on the position information, the sine seek controller 123 provides a feed forward signal to the stacked actuator 108. The feed forward signal causes stacked actuator 108 to pivot or rotate about axis 112. This, in turn, causes slider 126 and the transducers mounted on slider to move radially over the surface of the disc 102 in a generally arcuate path as indicated by arrow 128. Once the transducer is properly positioned, drive controller 116 then executes a desired read or write operation. The seek controller of the drive controller 116 controls gross movement of a head to position the head at a desired location on the disc. The track controller fine tunes the head position to maintain the head over a desired track.

Figure 1:
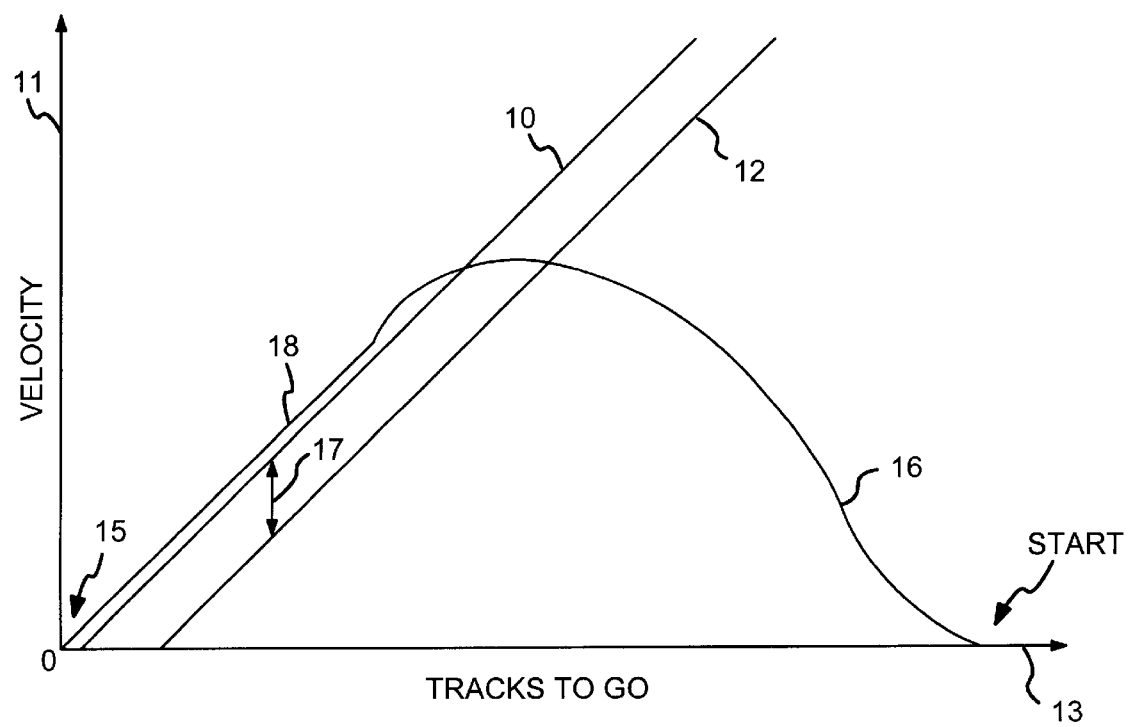
FIG. 1 is a graph of an estimated velocity profile for a sine seek controller under nominal conditions.

In a preferred embodiment of the invention, drive controller 116 includes a sine seek controller. As previously described, sine seek controllers operate by looking for a constant amount of velocity error between a demanded and an estimated velocity to decide when to switch from acceleration to deceleration. When the error is less than this constant amount, the switch is made. At that point, the feed forward signal transitions the controller from acceleration to deceleration and, once the feed forward sequence has completed, the controller will close the loop and return to velocity control. In order to prevent resonances when the loop is closed, the velocity error switch point is set empirically for each seek length range so that the estimated velocity is slightly more than the demand velocity upon completion of the feed forward sequence as can be seen at region 18 of FIG. 1.

Figure 2:
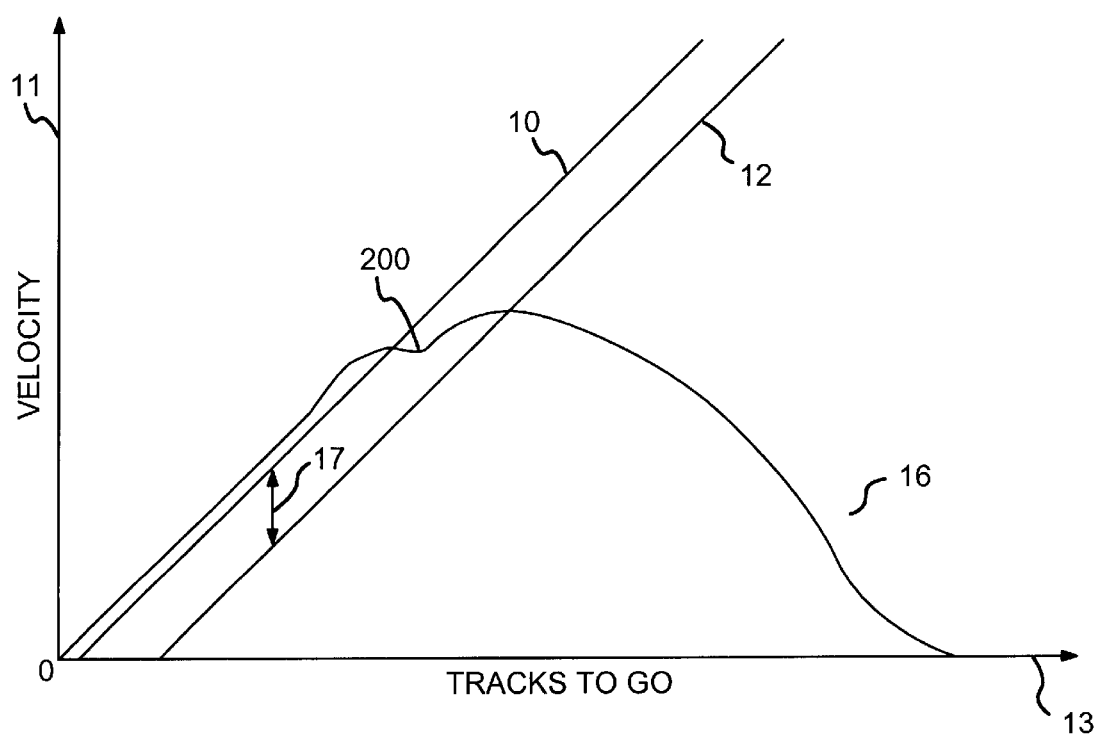
FIG. 2 is a graph of a demand velocity profile at lower than nominal conditions.

As previously described, at lower than nominal conditions, the controller can not accelerate quite as quickly, thereby achieving less momentum by the time the switch point is reached. Consequently, the feed forward signal overcompensates and the estimated velocity is less than the demand velocity when the loop is closed. As a result, the controller is forced to accelerate for a short period of time and then decelerate again. FIG. 2 illustrates this phenomenon. The bump 200 seen excites resonances that greatly impact the drive's ability to settle on a destination track.

There are several possible ways to compensate for lower than nominal current conditions. One solution is to reduce the amplitude of the feed forward current signal to prevent overcompensation. Another solution is to reduce the velocity error switch point. As previously noted, SDEM is a scalar value limited to a value of one or less. This scalar value, SDEM, can be used to reduce either the feed forward current amplitude or the velocity error switch. Preferably, however, it has been found that reducing both the feed forward amplitude and the velocity error switch point prevents overcompensation without leading to under compensation for lower than nominal conditions.

Figure 4:
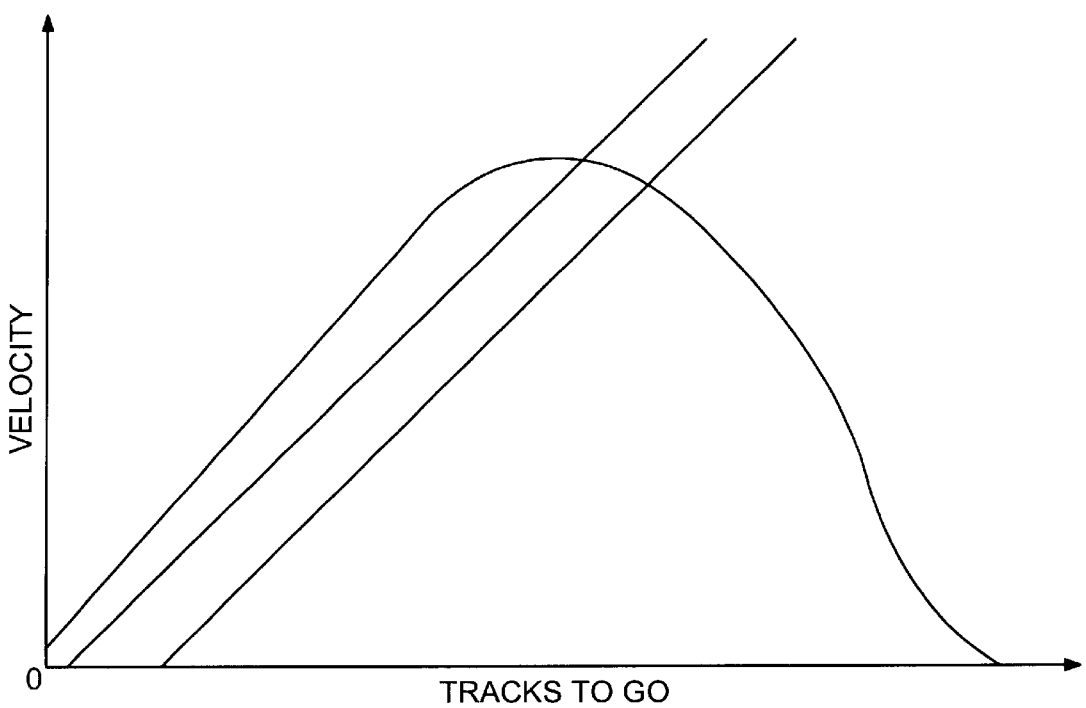
FIG. 4 is a graph of an estimated velocity profile showing a sine seek controller under above nominal conditions.

Besides problems arising at lower than nominal conditions, other problems arise during higher than nominal current conditions. These conditions are reached via high voltages, low temperatures or combinations thereof. During these conditions, more momentum can be achieved during the acceleration phase of the seek operation. This means that feed forward current under compensates and the estimated velocity is much higher than the demand velocity when the loop is closed. Once the loop closes, the controller must decelerate even harder to slow down sufficiently to reach the desired destination. This can lead to saturation which, as previously described, can result in overshoot and calibration difficulties. FIG. 4 is a graph illustrating this condition.

A solution to this condition involves increasing the velocity error switch point in order to permit more margin for deceleration from the feed forward current. This prevents under compensation (demand velocity overshoot). While this could be achieved by allowing the scalar value SDEM to exceed a value of one, it is important to remember that different drives have different coil resistances and different board voltage losses. This means that the scalar value SDEM can vary significantly from drive to drive at nominal conditions, which can lead to a degradation in performance consistency since it is used to scale the demand velocity. Preferably, it has been found that a region of hysteresis should be allowed near nominal conditions where SDEM is set equal to one. Outside of this range, a scalar should be allowed to assume values either greater to or less than one. Preferably, this is accomplished by using two scalar values, SDEM as calculated above, and SDEM2 as calculated by equation (2) below:

$$SDEM2 = \text{measured current}/I\_NOM2$$

where I_NOM2 is less than I-NOM1. While SDEM is limited to a value ranging from 0 and 1, SDEM2 preferably ranges from 1 to 2. This will provide a consistent performance from drive to drive while protecting a drive from self-inflicted damage at resistance margins caused by voltage and temperature extremes.

Figure 5:
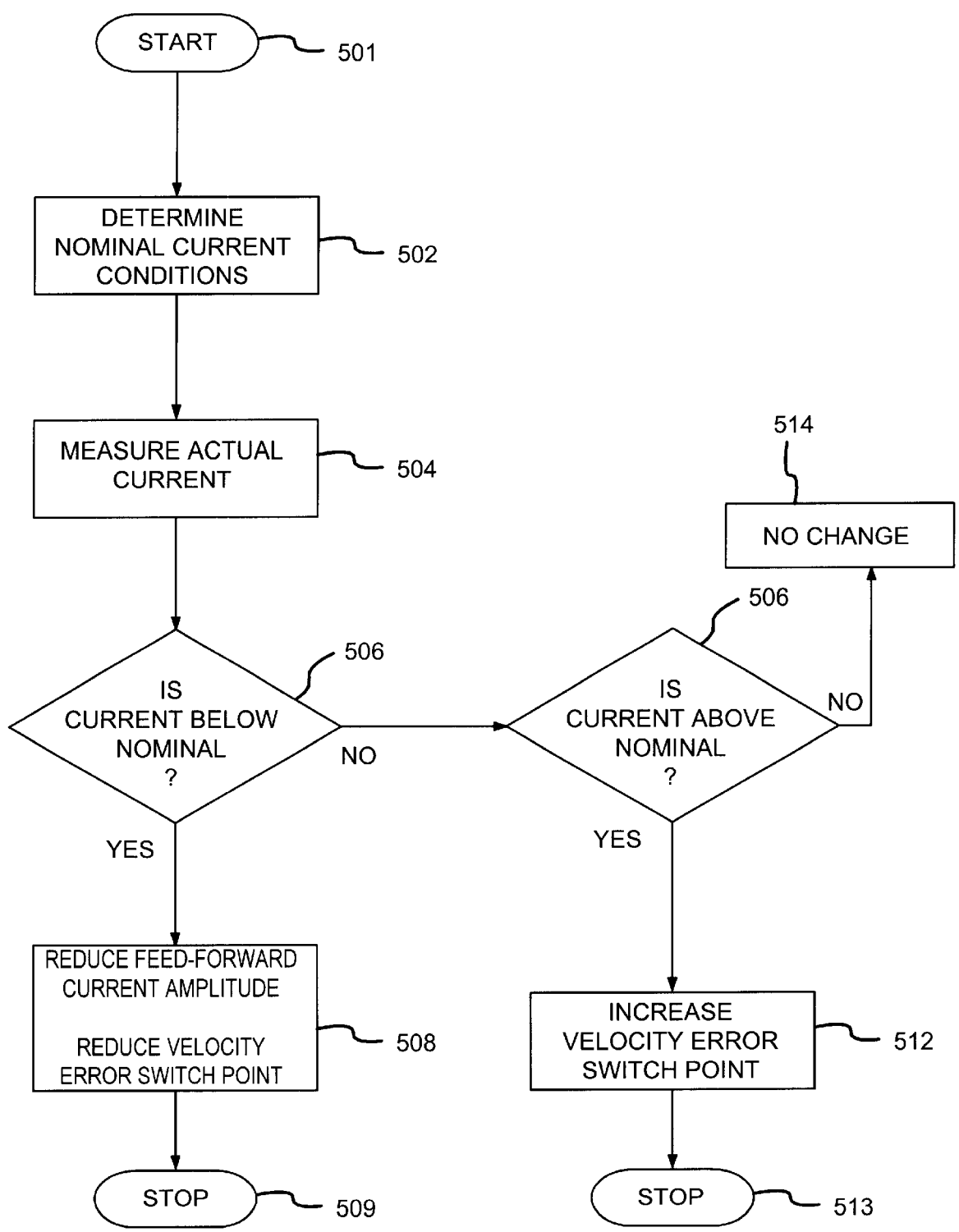
FIG. 5 is a flowchart illustrating an embodiment of the invention.

Preferably, SDEM1 is used to scale both the feed forward current amplitude and the velocity error switch point under lower than nominal conditions while SDEM2 is used to scale only the velocity error switch point under higher than nominal conditions. This provides ample cushion for operating margins and will prevent sine seeks from overshooting and corrupting calibrations. These scaling methods are best described in relation to the flowchart shown in FIG. 5.

Starting at block 502, nominal current conditions I_NOM1 and I_NOM2 are determined. At block 504 the current supplied to the actuator at saturation is measured. At block 506, it is determined whether the measured current is lower than I_NOM1. If it is, then at block 508 of the controller reduces the feed forward current amplitude and velocity error switch point. If it was determined at block 506 that the measured current is not lower than I_NOM1, then at block 510 it is determined whether the measured current is greater than I_NOM2. If it is then at block 512, the controller increases the velocity error switch point. If it is determined at block 510 that the measured current is not greater than I_NOM2, then at block 514, no change is made in the controller.

In summary, according to a first aspect of the invention, there is provided a method for adaptively controlling operation of a sine seek controller of a disc drive. The sine seek controller provides a feed forward signal to an actuator during a portion of the operation of the actuator and the sine seek controller provides a velocity control signal to the actuator during another portion of the operation of the actuator. The sine seek controller also stores a velocity error switch point. The method includes steps of supplying a feed forward signal to an actuator operatively coupled to the controller, measuring a signal output by the controller (504), decreasing an amplitude of the feed forward signal by a first scalar value if the measured signal is lower than a first nominal value (506, 508) and increasing the velocity error switch point by a second scalar value if the measured signal is higher than a second nominal value (510, 512), wherein the second scalar value is different from the first scalar value.

According to a second aspect of the invention, there is provided a disc drive having a controller (126) and an actuator (128) operatively coupled to the controller (126). The controller (126) supplies a feed forward signal during a portion of a seek operation and a velocity control signal during another portion of a seek operation and also stores a velocity error switch point. The actuator (128) receives the feed forward signal and velocity control signal. The controller (126) is programmed to detect the feed forward signal output by it. The controller (126) is also programmed to decrease an amplitude of the feed forward signal by a first scalar value if the detected feed forward signal is lower than a first nominal value, or increase the velocity error switch point by a second scalar value if the measured signal is higher than a second nominal value.

According to a third aspect of the invention, the method also includes decreasing the velocity error switch point by the first scalar value if the measured signal is lower than the first nominal value.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for adaptively controlling operation of a sine seek controller of a disc drive, the method comprising steps of:
   (a) supplying a feed forward signal to an actuator operatively coupled to the controller;
   (b) measuring a signal output by the controller;
   (c) decreasing an amplitude of the feed forward signal by a first scalar value determined using a first nominal value if the measured signal is lower than the first nominal value; and
   (d) if the measured signal is higher than a second nominal value, increasing a velocity error switch point by a second scalar value determined using the second nominal value, wherein the second nominal value is different from the first nominal value.

2. The method of claim 1 further comprising a step (e) of decreasing the velocity error switch point by the first scalar value if the measured signal is lower than the first nominal value.

3. The method of claim 1 further comprising steps of:
   (e) calculating the first scalar value by dividing the measured signal by the first nominal value; and
   (f) calculating the second scalar value by dividing the measured signal by the second nominal value wherein the second nominal value is greater than the first nominal value.

4. The method of claim 3 further comprising a step (g) of limiting the first scalar value to a maximum of one.

5. The method of claim 3 further comprising a step (g) of limiting the second scalar value to a range of 1 to 2.

6. A disc drive comprising:
   an actuator;
   a controller operatively coupled to the actuator wherein the controller sends a feed forward signal to the actuator during a portion of a seek operation and the controller sends a velocity control signal to the actuator during another portion of a seek operation, the controller also storing a velocity error switch point; and
   wherein the controller is programmed to detect the feed forward signal output by it and decrease an amplitude of the feed forward signal by a first scalar value determined using a first nominal value if the detected feed forward signal is lower than the first nominal value, or if the detected signal is higher than a second nominal value different from the first nominal value, increase the velocity error switch point by a second scalar value determined using the second nominal value.

7. The drive of claim 1 wherein the second nominal value is less than the first nominal value.

8. The drive of claim 6 wherein the controller is further programmed to decrease the velocity error switch point by the first scalar value if the measured signal is lower than the first nominal value.

9. The drive of claim 6 wherein the first scalar value is calculated by dividing the measured signal by the first nominal value and the second scalar is calculated by dividing the measured signal by the second nominal value.

10. The drive of claim 6 wherein the first scalar value ranges from 0 to 1.

11. The drive of claim 6 wherein the second scalar value ranges from 1 to 2.

12. A disc drive comprising:
   a controller;
   an actuator operatively coupled to the controller wherein the controller supplies a feed forward signal during a first portion of a seek operation and a velocity control signal during another portion of a seek operation and stores a velocity error switch point; and
   means for adjusting the feed forward signal output by the controller by a first scalar value determined using a first nominal value if a measured feed forward signal during the first portion is lower than the first nominal value and, if the measured signal is higher than a second nominal value, adjusting the velocity error switch point by a second scalar value determined using the second nominal value.

13. The drive of claim 12 wherein the means for adjusting is program code loaded on the controller.

* * * * *